United States Patent [19]
Aoki et al.

[11] Patent Number: 4,751,208
[45] Date of Patent: Jun. 14, 1988

[54] METHOD OF PRODUCING A SPINEL TYPE CERAMIC SINTERED BODY

[75] Inventors: Rokuro Aoki; Nobuo Takagi, both of Tokuyama, Japan

[73] Assignee: Nippon Chemical Industrial Co., Inc., Yamaguchi, Japan

[21] Appl. No.: 880,815

[22] Filed: Jul. 1, 1986

[30] Foreign Application Priority Data

Jul. 10, 1985 [JP] Japan ................. 60-149993

[51] Int. Cl.[4] ............ C04B 35/14; C04B 35/42; C04B 35/44
[52] U.S. Cl. .................. 501/114; 501/120; 501/122; 501/132; 501/133; 501/155
[58] Field of Search .......... 501/114, 117, 120, 122, 501/155, 132, 133, 130, 131

[56] References Cited

U.S. PATENT DOCUMENTS

| 1,814,088 | 7/1931 | Housman | 501/132 OR |
| 2,063,154 | 12/1936 | Easter et al. | 501/132 X |
| 2,311,970 | 2/1943 | Seil | 501/114 OR |
| 2,911,313 | 11/1959 | Sandmeyer | 501/132 X |
| 3,132,954 | 5/1964 | Alper et al. | 501/115 OR |
| 3,188,219 | 6/1965 | Miller et al. | 501/115 OR |
| 3,278,320 | 10/1966 | Neely et al. | 501/111 OR |
| 3,342,616 | 9/1967 | Alper et al. | 501/117 OR |
| 3,635,740 | 1/1972 | Davies et al. | 501/114 X |

FOREIGN PATENT DOCUMENTS

| 0041009 | 4/1976 | Japan | 501/132 |
| 113822 | 4/1976 | Japan . | |
| 51-81806 | 7/1976 | Japan . | |
| 201107 | 5/1984 | Japan . | |
| 1178737 | 9/1985 | U.S.S.R. | 501/115 |

Primary Examiner—Mark L. Bell
Assistant Examiner—Karl Group
Attorney, Agent, or Firm—Tilton, Fallon, Lungmus & Chestnut

[57] ABSTRACT

A spinel type ceramic sintered body is provided starting from a chromiferous slag which is a waste discharged from sodium chromate production, said sintered body being reproduceable by selecting the mole ratios of $R_2O/MgO$ to 0.9-2.0 and $SiO_2/MgO$ to 1-6 wherein R represents collectively Al, Fe and Cr, the sintered body having high thermal conductivity falling within the range of 1.3-2.5 kcal/mh° C., specific electric resistance falling within the range of $10^2-10^7$ cm high mechanical strengths and unique coloration and which can be used as a functional tile.

4 Claims, No Drawings

METHOD OF PRODUCING A SPINEL TYPE CERAMIC SINTERED BODY

BACKGROUND OF THE INVENTION

The present invention relates to a spinel type ceramic sintered body and a method of producing same, and more particularly a sintered body of spinel type ceramic particularly comprised by adding an aluminium silicate powder containing at least a clay into a chrom slag discharged as waste from sodium chromate production and reaction-sintering said mixture to form a ceramic sintered body, said sintered body being characterized by having excellent thermal conductivity, mechanical strength, magnetic properties and the like and capable of being used for functional tiles, for example.

In the commercial production of sodium chromate, a method has been commonly employed, wherein alkali agents such as soda ash and/or sodium hydroxide, if necessary, lime or an inert filler are mixed in a chromium ore, the resultant mixture then being subjected to an oxidative roasting at an elevated temperature and the roasted product thus obtained being subsequently leached with water to produce sodium chromate as an aqueous solution, at which time a great amount of chrom slag (simply referred to as chrom slag hereafter) is produced as a by-product.

Since hazardous hexavalent chromium is contained in said slag, dumping it without any treatment would pollute the soil and water causing enviromental pollution, hence methods for making it non-hazardous have been employed. Among these include a method which reduces the hexavalent chromium to a trivalent one by directly adding a reducing agent to the chrom slag or another method in which reduction of chrom slag at a high temperature is carried out by adding a silicate material and a reducing agent, but presently in either case the treated waste material is merely dumped or utilized as an earth filling material or an aggregate.

On the other hand, the present applicants have developed processes for applying the chrom slag in the ceramics field as an effective utilization of chrom slag and filed the following patent applications; Japanese Patent Application Laid Open Nos. 51-41009, 51-81806, and 59-92968.

However, since in terms of its properties, chrom slag has a great deal of variety in its physical characteristics not to mention in its chemical compositions, when trying to effectively utilize it industrially reproducability was remarkably lacking not only in the step of producing ceramic products but also in all the various physical and chemical characteristics of the produced ceramics.

Although normal chrom slag contains a calcium component, it was found that ceramic products manufactured using high calcium containing chrom slag have a problem in that such ceramics are inferior both in functions and durability. In view of the above facts, the applicants, intending to positively utilize the chrom slag effectively, eagerly carried out research aimed at improving the physical characteristics and methods of producing ceramic sintered bodies having chrom slag as the main raw material, whereupon the special features that are exhibited when a chrom slag having a specific chemical composition is used as a ceramic raw material were discovered and furthermore, it was also confirmed that the above fact is reproducable in the same way using other materials without being limited to the use of chrom slag as long as they are formulated to said specific chemical composition, hence arriving at the present invention.

SUMMARY OF THE INVENTION

The present invention relates to a spinel type ceramic sintered body and a method for producing same, wherein said body comprises a dense, reacted sintered one, major mineral composition of which composed of a quartz and a spinel solid solution in which Al, Fe and Cr are in mutual solid solution based on analysis of the chemical composition and X-ray diffraction, said sintered body having a thermal conductivity falling within the range of between 1.3–2.5 kcal/mh° C., and a specific resistance within the range of between $10^2$–$10^7$ $\Omega$cm.

DESCRIPTION OF THE PREFERRED EMBODIMENT

As previously mentioned, the main mineral composition of the sintered body according to the present invention comprises a spinel solid solution and a quartz. The presence of the quartz can easily be confirmed by X-ray diffraction and the presence of the solid solution can be also confirmed by the shift of the lines on an X-ray diffraction pattern from those of a pure spinel (MgO, $Al_2O_3$) crystal as well from its chemical composition.

Although the sintered body of the present invention may possibly include another crystal phase other than the above two phases in view of X-ray diffraction, since the mineral compositions that can be clearly recognized are the above two, it can be so said that the ceramic mainly consists of the above two mineral compositions.

Thus, the above mentioned spinel solid solution can be indicated, expressed in terms of atomic ratios, by the following general formula:

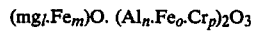

$(mg_l \cdot Fe_m)O \cdot (Al_n \cdot Fe_o \cdot Cr_p)_2O_3$ wherein $l=0.4–1.0$, $m=0–0.6$ but $l+m=1$, $n=0.2–0.5$, $o=0.2–0.6$, $p=0.2–0.6$ but $n+o+p=1$.

The reason why the sintered body according to the present invention provides such a characteristic spinel composition can be attributed to the use of specific raw materials comprising a powder containing oxides of chromium and iron as the major ingredients and aluminium silicate containing at least a clay on the one hand, and on the other hand, the specific formulation of the above raw materials. Therefore, these two raw materials result in a characteristic dense, reacted sintered body exhibiting the above mentioned thermal conductivity and specific resistance. Furthermore, depending upon the formulation of the raw materials some of the sintered bodies also have magnetic properties.

As a result of the formation of a dense, reacted, sintered body, the ceramic sintered body of the present invention has mechanical strength such as a compressive strength in the range of 500–2000 kg/cm$^2$ and a modulus of rupture in the range of 200–500 kg/cm$^2$. It also has a porosity and water absorption rate of less than 2%.

Moreover, the sintered body of the present invention has a black tone, changes in shading resulting from variations in the mineral composition and a sonorous color tone similar to black granite can be obtained depending upon the selection of the aluminium silicate raw material.

Thus, the commercial production of such spinel type ceramic sintered bodies can be carried out advantageously with high reproducability by the method which is characterized by the steps comprising:

(a) preparing a ceramic base material by formulating raw materials, i.e. powder containing oxides of chromium and iron as the major ingredients and an aluminium silicate containing at least a clay into the following ranges expressed in terms of mole ratios:

$$\frac{R_2O_3}{MgO} = 0.9\text{-}2.0; \quad \frac{SiO_2}{MgO} = 1\text{-}6$$

wherein R represents collectively Al, Fe and Cr, and then mixing the raw materials;

(b) molding the resultant ceramic base material and drying the resultant molded product to form a green molded body;

(c) reacting and concomitantly sintering the green molded body in a hot atmosphere at a temperature in the range of 1150°–1300° C. to form a ceramic sintered body.

In the above method, description is made using a powder containing oxides of chromium and iron and aluminium silicate powder, but even though chrom slag is particularly exemplified as said powder. Thus, a chromite ore or a powder containing both chromium oxide and iron oxide or their precursors can also be used besides the chrom slag.

Although the chrom slag has a wide variety of chemical compositions due to its inherent nature, in the present invention it must have a composition falling within the following ranges; $Cr_2O_3$: 2–18 wt. %; CaO: 0–15 wt %; $Fe_2O_3$: 10–45 wt %; $Al_2O_3$: 5–20 wt %; MgO: 5–20 wt % and others: 2–10 wt %.

As can obviously be seen from the above, the content of CaO in the chrom slag to be used in the present invention used as the powder containing oxides of chromium and iron must be as low as possible and at the most 15 wt %, in contrast to the fact that chrom slag generally contains a great deal of CaO.

As a result of a great deal of experiments it has been ascertained that the reasons for the low CaO requirement can be attributed to the fact that if the amount of CaO ingredient were to be greater than about 15 wt %, it would cause a sudden lowering in the melting point of the chrom slag, making it difficult to control the sintering step and drastically changing the physical properties of the resultant sintered body so that they will be totally removed from the characteristic physical properties of the ceramic sintered body that would otherwise be obtained, even though the CaO ingredient is very effective because it acts as a mineralizer to the sintered body in promoting the formation of a spinel phase.

In addition to the required composition of the powder containing oxides of chromium and iron as the major ingredients such a powder must have particle sizes which all pass through an 80 mesh screen, and greater than 50% of which pass through a 200 mesh screen. Particularly, when chrom slag is used it is desirable to use as fine a powder as possible. Generally, a fine particle size is preferable as a raw material for ceramic production in terms of its properties, and in the present invention the adjustment of particle size in the range set forth above is important as one of the requirements for the substantial reduction of hexavalent chromium to trivalent in the chrom slag.

On the other hand, clay must at least be used as the aluminium silicate source, but other materials, in addition to clay, such as fly ash and/or a material which contains both $Al_2O_3$ and $SiO_2$ and which is readily available may be used depending upon necessity. As the clay no limitation is posed on its composition, origin and the like, and thus generally so-called clays, pottery stone, feldspar, agalmatolite and the like may be suitably used.

As a result of many experiments effected by the inventors difficulties such as fluctuations in the production conditions and physical properties of the product, difficulties which make it difficult to set the production conditions and physical properties of the product, can be eliminated by establishing the steps comprising formulating raw materials expressed in terms of mole ratios in the ranges:

$$\frac{R_2O_3}{MgO} = 0.9\text{-}2.0; \quad \frac{SiO_2}{MgO} = 1\text{-}6$$

wherein R represents collectively Al, Fe and Cr, and mixing them to form a ceramic base material, said difficulties being apt to arise without the establishment of the above steps, and thus the establishment of the formulation is very important to reproducably carry out the formation of the sintered body of the present invention. Thus, if the raw materials were formulated outside the above mole ratio ranges, not only would the sinterability be lowered with insufficient reduction of hexavalent chromium to trivalent but also the amount of spinel in the resultant sintered body would become lower so that the above mentioned characteristic physical properties cannot be obtained, which makes impossible to obtain the objectives behind the dense ceramic sintered body of the present invention.

The steps of preparing ceramic base material, subsequent drying and molding it to form a green molded body may be carried out using conventional procedures so that there is no need to limit these procedures.

Thus, in preparing the ceramic base material it may be desirable to add a small amount of any desired organic or inorganic binder or water according to necessity to facilitate the subsequent molding procedure.

In the subsequent molding step, either dry or wet molding technique may be used, it is, however, generally preferable to use dry molding technique in many cases in terms of commercial production and the physical properties in which event the use of molding pressure of at least 300 kg/cm² may be preferable. In the case of extrusion molding, for instance, the molding should preferably be carried out under conditions of plasticity lower than the plasticity measured by the so-called Pfeffer Cone technique.

It is of course necessary for the green molded body prepared by wet molding technique to be subjected to a drying procedure in order to control the water content thereof, but it is also required the product prepared by dry molding technique.

Subsequent to the provision of green molded bodies of ceramic base material consistent with their respective purposes, sintering is carried out in a hot atmosphere of at most 1150°–1300° C. As a burning furnace commonly used burning furnaces such as electric furnaces, gas furnaces, kerosene or heavy oil burning furnaces and the like can be suitably employed. Although the melting point of ceramic base material significantly varies depending upon the nature of raw materials used and their formulation, it is preferable to carry out sintering at as high temperature as possible for as long as possible. In cases where sintering is carried out at a temperature at which the ceramic base material sinters, the ingredients in said material convert to a mineral composition of spinel as a result of reactions arising between them resulting in a dense sintered body having high strength along with low water absorption.

While the objective sintered body can be obtained in a so-called oxidative, neutral, or reductive atmosphere, it has been found that both the spinel-forming and sintering reactions of the ingredients are proceeded in a faster rate, the lower the oxygen concentration is or the higher the carbon monoxide concentration is.

Where chrom slag is used as the starting material of the powder containing oxides of chromium and iron as the major ingredients, the hexavalent chromium existing therein as $CrO_3$ in an amount of about 0.5-1.5 wt % is substantially reduced with a silicate value co-existing in the green base material to be sintered in an appropriate amount according to the following formulae:

$$2CaO \cdot CrO_3 + 2SiO_2 \rightarrow 2CaO \cdot SiO_2 + Cr_2O_3 + 3/2O_2$$

$$2Na_2O \cdot CrO_3 + 2SiO_2 \rightarrow 2Na_2O \cdot SiO_2 + Cr_2O_3 + 3/2O_2$$

Further, an alumina-containing material provides similar effect to the above silicate value and after all, an almina-silicate containing material employed as the raw material for the ceramic material not only acts as the raw material, but also generally acts both as a neutralizing agent for any alkaline components and as a reducing agent for hexavalent chromium existing in the chrom slag, and therefore, no hexavalent chromium can be detected in the final sintered body of the present invention, thus no problems which stem from hexavalent chromium arise.

Since the thus produced spinel type ceramic sintered bodies have characteristic physical properties such as thermal conductivity in the range of 1.3–2.5 kcal/mh °C. and specific resistance in the range of $10^2$–$10^7$ Ωcm as set forth above, these properties are several times superior to those of common ceramics prepared from aluminosilicates in which the former is 0.5–0.8 kcal/mh °C. and the latter is greater than $10^{10}$ Ωcm.

The uses arising from the thermal conductivity due to such characteristics are of course the utilization as heat transfer equipment in industrial heat exchangers and they also can be expected to be used as common architectual materials which require thermal conductivity, for acting as a energy-saving material, such as roofing. material, flooring material, wall material and the like.

Moreover, taking advantage of the high electric conductivity, such sintered bodies can sufficiently serve as an antistatic material and an electromagnetic wave shielding material.

The following examples will elucidate more fully the present invention.

EXAMPLE 1

A clay having a particle diameter passing fully through a 200 mesh screen was compounded with 100 parts by weight of chrom slag having the composition indicated in Table 1 in mole ratios set forth below to form a mixture:

$$\frac{R_2O_3}{MgO} = 1.1; \quad \frac{SiO_2}{MgO} = 1.3$$

An amount of water (6% by weight on the basis of the dry mixture) was added to the mixture and mixed uniformly. The resultant mixture was placed in a 10 cm square metal mold and subjected to a pressure molding under a pressure of 400 kg/cm² to form a green molded product having dimensions of 10 cm×10 cm×2 cm which was then dried at 100° C. for 8 hours followed by burning in a butane gas-burning gas furnace in accordance with the schedule shown in Table 2.

The physical properties of the resultant ceramic sintered body are shown in Table 3.

TABLE 1

| The Composition of Chrom Slag (% by weight) | | | | | | |
|---|---|---|---|---|---|---|
| $Cr_2O_3$ | $Al_2O_3$ | $Fe_2O_3$ | FeO | MgO | CaO | Others |
| 13.8 | 16.5 | 30.0 | 10.0 | 14.2 | 3.0 | 12.5 |

TABLE 2

| | Sintering Time Schedule | | |
|---|---|---|---|
| Temperature (°C.) | Temperature Increase Rate (°C.) | Time Required (hr) | Burning Gas Atmosphere |
| 0 → 1000 | 100 | 10 | $O_2$ 3–5 vol. % |
| 1000 → 1250 | 50 | 5 | CO 1–3 vol. % |
| 1250 | 0 | 4 | $O_2$ 3–5 vol. % |
| 1250 → 200 | Stop Burning | 20 | — |

TABLE 3

| Physical Properties of the Sintered Body | |
|---|---|
| Item | Measured Value |
| Thermal Conductivity | 1.9 kcal/mh °C. |
| Specific Resistance | 6 × 10³ Ωcm |
| Compressive Strength | 2500 kg/cm² |
| Bending Strength | 450 kg/cm² |
| Porosity | 0.3% |
| Water Absorption | 0.3% |
| Leached $Cr^{6+}$ | Not detected |
| X-Ray Diffraction | Crystal phase of spinel solid solution (*) and quartz were detected |

(*) From X-ray diffraction and chemical analysis this was found to be: $(Mg_{0.7}Fe_{0.3})O(Al_{0.30}Fe_{0.39}Cr_{0.31})_2O_3$

EXAMPLE 2

A clay having a particle diameter fully passing through a 200 mesh screen was compounded with a chrom slag having the composition and particle diameter indicated in Example 1 in the following mole ratios:

$$\frac{R_2O_3}{MgO + FeO} = 1.4; \quad \frac{SiO_2}{MgO} = 4.5$$

wherein R represents collectively Al, Fe and Cr, and an amount of water was added to the resultant mixture so as to attain a plasticity value of 17.5 measured by the Pfeffer Cone technique followed by mixing. The mixture thus obtained was extruded in a vacuum extruder to dimensions 10 cm×10 cm×2 cm and then the resultant green molded product was dried as in Example 1 followed by sintering at a maximum temperature of 1200° C. The physical properties of the resultant ceramic sintered body are shown in Table 4.

TABLE 4

| Physical Properties of Sintered Body | |
|---|---|
| Item | Measured Value |
| Thermal Conductivity | 1.5 kcal/mh °C. |
| Specific Resistance | $7 \times 10^5$ Ωcm |
| Compressive Strength | 2200 kg/cm$^2$ |
| Bending Strength | 350 kg/cm$^2$ |
| Porosity | 0.2% |
| Water Absorption | 0.2% |
| Leached Cr$^{6+}$ | Not detected |
| X-Ray Diffraction | spinel solid solution (*) and quartz |

(*) From X-ray diffraction and chemical analysis this was found to be: $(Mg_{0.90}Fe_{0.10})O(Al_{0.41}Fe_{0.32}Cr_{0.27})_2O_3$

EXAMPLE 3

An amount of clay having particle diameter passing fully through a 200 mesh screen was added to a chromite ore having a particle diameter fully passing through a 200 mesh screen, the composition of which is illustrated in Table 5, to attain the following mole ratios:

$$\frac{R_2O_3}{MgO + FeO} = 1.9; \quad \frac{SiO_2}{MgO} = 4.8$$

The resultant mixture was treated as in Example 1 by adding water, mixing, molding, drying and sintering. The physical properties of the resultant sintered body are shown in Table 6.

TABLE 5

| The Composition of Chromite Ore (Percent by weight) | | | | | |
|---|---|---|---|---|---|
| Cr$_2$O$_3$ | Al$_2$O$_3$ | Fe$_2$O$_3$ | FeO | MgO | Others |
| 46.5 | 16.2 | 8.2 | 20.0 | 9.0 | 12.5 |

TABLE 6

| Physical Properties of Sintered Body | |
|---|---|
| Item | Measured Value |
| Thermal Conductivity | 1.7 kcal/mh °C. |
| Specific Resistance | $9 \times 10^5$ Ωcm |
| Compressive Strength | 2500 kg/cm$^2$ |
| Bending Strength | 400 kg/cm$^2$ |
| Porosity | 0.1% |
| Water Absorption | 0.1% |
| Leached Cr$^{6+}$ | Not detected |
| X-Ray Diffraction | Spinel solid solution (*) and quartz |

(*) From X-ray diffraction and chemical analysis it was found to be: $(Mg_{0.61}Fe_{0.39})O(Al_{0.25}Fe_{0.25}Cr_{0.25})_2O_3$ The ceramic spinel type sintered bodies of the present invention are dense in quality and have characteristic thermal conductivity, electric conductivity, mechanical strength and color tone and are capable of being used as functional ceramics.

Further, the method of the present invention not only makes chrom slag non-hazardous, eliminating pollution problems which would otherwise arise, but also makes it possible to produce a ceramic having specific properties by possitively utilizing the special properties contained in chromium compounds in chrom slag which would otherwise have no usefulness. It is needless to say that similar ceramics can be obtained by the use of other chromiferous raw materials.

What is claimed is:

1. A method of producing a spinel ceramic sintered body consisting essentially of a dense, reacted sintered body, the major mineral composition of which is composed of a quartz and a spinel solid solution in which Al, Fe and Cr are in mutual solid solution based on analysis of the chemical composition and X-ray diffraction, said sintered body having a thermal conductivity falling within the range of 1.3–2.5 kcal/mh °C., and a specific electric resistance within the range of 10$^2$–10$^7$ Ωcm, comprising (a) providing a powder of a chrome slag discharged as waste from sodium chromate production containing Cr$_2$O$_3$: 2–18 wt %; CaO: 0–15 wt %; Fe$_2$O$_3$: 10–45 wt %; Al$_2$O$_3$: 5–20 wt %; MgO: 5–20 wt % as the major ingredients and an aluminum silicate powder containing at least a clay having the composition expressed in terms of mole ratios:

$$\frac{R_2O_3}{MgO} = 0.9-2.0; \quad \frac{SiO_2}{MgO} = 1-6;$$

wherein R represents collectively Al, Fe and Cr, and mixing the resultant mixture to prepare a ceramic base material, (b) molding said ceramic base material and drying the resultant product to form a green molded body,
    (c) burning said green molded body in a hot atmosphere at a temperature between 1150°–300° C.

2. A method of producing a spinel ceramic sintered body according to claim 1, wherein said powder containing chromium and iron as the major ingredients has a particle diameter fully passing through a 80 mesh screen with a particle size of more than 50% passing through a 200 mesh screen.

3. A method of producing a spinel type ceramic sintered body according to claim 1 wherein molding is carried out at a pressure greater than 300 kg/cm$^2$.

4. A method of producing a spinel ceramic sintered body according to claim 1 wherein said burning step is carried out in a hot atmosphere containing a reductive atmosphere.

* * * * *